United States Patent
Cook et al.

(10) Patent No.: US 6,252,702 B1
(45) Date of Patent: Jun. 26, 2001

(54) INFRA RED FILTER

(75) Inventors: Trevor Cook, Devon; Adrian Saunders, Somerset, both of (GB)

(73) Assignee: Avimo Limited, Taunton (GB)

( * ) Notice: Subject to any disclaimer, the term of this patent is extended or adjusted under 35 U.S.C. 154(b) by 0 days.

(21) Appl. No.: 09/207,488

(22) Filed: Dec. 8, 1998

Related U.S. Application Data (63) Continuation of application No. PCT/GB97/01538, filed on Jun. 6, 1997.

(30) Foreign Application Priority Data

Jun. 8, 1996 (GB) .................................................. 9612027

(51) Int. Cl.[7] .................................................. G02B 13/14
(52) U.S. Cl. .......................................... 359/356; 359/350
(58) Field of Search .................................. 359/350, 355, 359/356

(56) References Cited

U.S. PATENT DOCUMENTS

| | | | |
|---|---|---|---|
| 3,694,179 | 9/1972 | Deeg et al. | 65/136 |
| 3,833,347 | 9/1974 | Angle et al. | 65/32 |
| 3,899,314 | 8/1975 | Siegmund | 65/23 |
| 3,944,352 | 3/1976 | Morgan | 353/55 |
| 4,023,951 | 5/1977 | Shaw et al. | 65/30 |
| 4,297,142 | 10/1981 | Ritze | 501/77 |
| 4,303,298 | 12/1981 | Yamashita | 359/350 |
| 4,481,023 | 11/1984 | Marechal et al. | 65/64 |
| 4,505,569 | 3/1985 | Seto et al. | 355/3 |
| 4,699,889 | 10/1987 | Sales et al. | 501/22 |
| 5,173,212 | 12/1992 | Speit et al. | 252/301.4 |
| 5,227,343 | 7/1993 | Osuka et al. | 501/77 |
| 5,242,868 | 9/1993 | Hara | 501/44 |
| 5,249,076 | 9/1993 | Fujiwara et al. | 359/350 |
| 5,529,960 | 6/1996 | Aitken et al. | 501/45 |

*Primary Examiner*—Cassandra Spyrou
*Assistant Examiner*—Jared Treas
(74) *Attorney, Agent, or Firm*—Akin, Gump, Strauss, Hauer & Feld, L.L.P.

(57) ABSTRACT

A phosphate glass doped with copper in an amount of less than 2% by weight is formed to produce a lens for use on external aircraft lights. The glass attenuates infra red radiation to a degree where it does not pose a danger of temporarily blinding a pilot wearing night vision goggles yet remains visible. The glass has little appreciable effect on light transmission in the visible spectrum. Conveniently, the glass can be formed by slumping at a softening temperature against a mold to produce intricate lens shapes. In addition, the glass is able to withstand conventional toughening processes.

17 Claims, 5 Drawing Sheets

COMPARISON OF OPTICAL TRANSMISSION FOR PRIOR ART FILTER WITH IR FILTER PRODUCED IN ACCORDANCE WITH INVENTION FOR 1 mm THICK SAMPLES

SECTION X-X

SECTION X-X

SECTION X-X

INFRA RED FILTER

CROSS-REFERNECE TO RELATED APPLICATION

This is a continuation of PCT/GB97/01538, filed Jun. 6 1997, the disclosure of which is incorporated herein by reference.

BACKGROUND OF THE INVENTION

The present invention relates to a phosphate glass for use as an infra red (IR) filter and to a method of forming the same, and is particularly but not exclusively directed towards filters for use on external lights for aircraft, ships and the like.

Aircraft lights, whether fitted to civil or military aircraft, generally comprise navigation lights at the wingtips (red port and green starboard) and white tail lights. High intensity anti-collision strobe lights are also fitted at the top and bottom of the fuselage.

Strict regulations operate to govern the color and intensity of aircraft lights. In the United Kingdom, the Civil Aviation Authority ("CAA") has responsibility for ensuring that all aircraft adhere to the regulations. For example, at least in relation to civil aircraft, the red and green wingtip lights must fall within stipulated color bandwidths, so that an aircraft whose lights emit an orange or a blue hue, rather than red or green, would fail to meet CAA regulations and hence be refused a licence.

Although military aircraft are exempt from these regulations, it is obviously desirable that lights on military aircraft conform as closely as possible to the specified standards.

To improve visibility under low light conditions, it is now common for pilots to fly wearing night vision goggles. These goggles are fitted with a filter to exclude light in the visible spectrum and operate by detecting radiation in the infra red ("IR") region (650 nm to 1000 nm). To maintain a good output image under varying light levels, the goggles are generally provided with automatic gain control.

While the automatic gain control operates satisfactorily in most conditions, it is unable to compensate when a very bright light is introduced into the field of view. Such a situation occurs, for example, when the pilot approaches another aircraft at night and results in the output image becoming very bright and occasionally the whole display is "bleached".

The inability of the goggles to cope with bright lights at night can therefore make it difficult for the pilot accurately to locate other aircraft in the vicinity and, at worst, may temporarily blind the pilot. In such circumstances, it will be appreciated that both aircraft can be placed in an extremely dangerous situation.

On the other hand, if other aircraft are to remain clearly visible and identifiable as such when viewed through night flying goggles, it is preferred that at least some IR radiation is permitted to emerge from the lights. In other words, the level of IR emission should ideally be suppressed but not entirely eliminated.

It will be appreciated that there is a fine balance to be struck between filtering sufficient IR radiation to avoid temporarily blinding the pilot yet transmitting enough IR radiation to allow the pilot to recognize lights on other aircraft in the vicinity.

To the best of our knowledge, no-one has been able to quantify the intensity of the IR transmission which meets the above criteria. Experts in the field do, however, recognize when an appropriate balance has been achieved. In this regard, the balance is considered to be about right when the effect around each aircraft light as viewed through the goggles resembles a "football". This phenomenon is the commonly used indicator by which the optimum IR transmission level is judged.

Of course, while the aforementioned problems are most acute for pilots flying close to other aircraft, it is also important that pilots are able clearly to view other structures in low visibility conditions, for example when approaching naval vessels such as aircraft carriers, marine structures such as off-shore oil and gas rigs, or land-based constructions such as airports or even high-rise buildings.

A further factor which must be taken into account when filtering IR radiation is the potential for the filter medium to affect the light emitted in the visible spectrum. In this regard, it can happen that attenuation of IR radiation is accompanied by a color shift in the visible range. With regard to wingtip lights, the amount of color shift can mean the difference between compliance with or failure to meet CAA regulations.

Attempts to solve the aforementioned problems of filtering out a proportion of the IR radiation yet avoiding significant color shifts have only been partially successful as outlined below.

For example, lenses for aircraft lights have hitherto been made only from conventional silicate glass because this has been the only glass suitable for forming into curved sections which are then bonded together to form the lenses. In this regard, silicate lenses are generally formed by molding or pressing while the glass is in the molten state.

Although IR filter glass of the silicate type is commercially available, it is of limited use for aircraft lights because the light emitted in the visible spectrum is also affected. In this regard, it produces a measurable color shift in the red region making it difficult to comply with the CAA regulations.

Rather than using the aforementioned IR filter glass, an alternative has been to provide a coating of an IR filter material on conventional silicate glass. The high temperatures involved in forming the glass sections for subsequent assembly into the lens means that such coatings can only be effectively applied after the forming stage. Moreover, to avoid accidental damage to the coating, it is preferable to apply the coating after the individual sections have been bonded together to form the complete lens.

However, coating with an IR filter material after assembly of the lens has still proved unreliable because of the highly contoured surfaces involved. In particular, it has been difficult to coat either the interior or exterior surfaces of the lenses uniformly.

In order to be effective, IR filter coatings must be evenly applied; too thin a coating will result in inadequate IR attenuation with potentially disastrous consequences and too thick a coating may block out the IR spectrum completely. Coating of lenses made from conventional silicate glass is therefore problematic.

As far as other types of glass are concerned, it is known to dope phosphate glass with copper in order to achieve low transmission in the IR range and such a glass has been used to shield illuminated color displays such as those in aircraft cockpits. IR filter glass of this type, for example as is documented in U.S. Pat. No. 5,173,212 commonly assigned to Schott Glaswerke, is commercially available. However, for external lighting applications the glass would need to be only 1 mm thick, rendering it useless mechanically; in particular, because of its inability to withstand the treatment involved in known glass toughening processes. Such treatment is essential if it is to achieve the strength and durability required for the demanding physical conditions encountered when used on aircraft exteriors.

Moreover, in its known applications phosphate glass is characterized by its brittle nature and hence it has not hitherto been possible to form into substantially non-planar components.

SUMMARY OF THE INVENTION

It is evident from the above that the problem of finding a material which can be toughened to make it suitable in particular for aviation use, which is able to reduce IR transmission to a satisfactory level yet not eliminate it entirely, which does not result in adverse color shifts in the visible range, and which is capable of being formed to make lenses remains to be solved.

With the above objectives in mind, we have set out to produce such a material. Accordingly, it is an object of the present invention to provide a material suitable for use in aircraft and other lighting which not only provides attenuation of IR radiation but also has no appreciable affect on the visible spectrum and which is able to withstand conventional glass toughening processes both mechanically and optically.

Despite the prior art indicating the apparent unsuitability of phosphate glass as a material for forming into lenses such as for aircraft lights, we have undertaken extensive research and development into this material. As a result of our efforts, we have not only invented a material comprising phosphate glass which is able to attenuate IR radiation to the desired levels, but have also invented a method by which phosphate glass can be formed into non-planar elements, such as aircraft lenses or components thereof.

From a first aspect, the present invention resides in a phosphate glass for use as an IR filter, wherein the glass is doped with copper (II) oxide in an amount of less than 2% by weight based on the total weight of the glass.

Expressed in another way, the invention comprises an IR filter comprising a phosphate glass doped with copper, wherein the copper is present in the glass as copper (II) oxide in an amount of less than 2% by weight based on the total weight of the glass.

The actual amount of copper included in the glass of the invention will vary according to a number of factors, the main ones being the thickness of the glass itself and the light source which is to be filtered. For instance, the emission characteristics of a high intensity strobe light will differ from those of the tail lights and those of the red and green wingtip lights.

In addition, the thickness of the glass will vary for controlling the optical properties to suit a particular application, for example, according to whether it is to be used as an auxiliary filter in conjunction with an existing lens or as a replacement lens.

However, by means of this invention, it is possible to attenuate the IR radiation to a level which does not have an adverse effect on the automatic gain control of the pilot's goggles yet allows the pilot to readily identify the light source. Moreover, the glass composition has little or no appreciable effect on the visible spectrum.

As will be understood, in order to be suitable for use on an exterior aircraft light, especially when used as a replacement lens, the filter material must be mechanically very strong. In this regard, we have found that when phosphate glass has a thickness of from about 2 mm to 6 mm it can acquire sufficient strength for such use.

While commercial phosphate glass has heretofore been available in slabs, sheet, etc in appreciable thicknesses, because of its high attenuation in the IR and lower visible range, it has had to be machined to a thickness of about 1 mm in order to provide acceptable transmission characteristics. At such a thickness, the glass has no strength and is incapable of surviving a toughening process.

From another aspect therefore, the invention resides in an IR filter for use as lens comprising a copper doped phosphate glass having a thickness of from about 2 mm to 6 mm. The expression "from about 2 mm to 6 mm" includes any range or specific value therebetween. More especially, the invention resides in a toughened copper doped phosphate glass having such a thickness.

In a preferred embodiment, the phosphate glass has a thickness of between about 3 mm and 5 mm. However, it will be appreciated that the thickness may be varied within the aforementioned range according to the type of light source involved.

While the IR filter according to the invention is generally used at thicknesses between about 2 mm and 6 mm, the filter is preferably manufactured in sheets or slabs having a thickness of about 10 mm or more. Thus, we have found that only the central or middle core of the manufactured glass possesses the required optical properties for use as a filter. Grinding, polishing and other known forms of cold working are used to arrive at the desired thickness. Once at the desired thickness, the glass may then be subjected to forming processes.

Unlike previously known IR filter phosphate glass, the phosphate glass of the invention is mechanically well able to withstand the stresses which are induced during subsequent glass toughening processes. Being able to withstand a toughening process is of course a prerequisite for achieving the necessary strength for use as lenses on aircraft lights. Significantly, the phosphate glass of the invention retains its optical properties during toughening.

In order to achieve the desired attenuation of IR yet maximize transmission of visible light, particularly at the red end of the visible spectrum, the IR filter having a thickness in the range specified preferably comprises copper doped phosphate glass having a copper (II) oxide content of less than 2% by weight based on the total weight of the glass.

Advantageously, the copper (II) oxide content of the phosphate glass is from about 1.5 to 1.8% by weight or any value or range in between; more preferably between about 1.6 to 1.7% by weight.

Apart from limiting the copper (II) oxide content to below 2% by weight, which is essential for achieving the desired optical properties, other components are present in varying amounts to contribute to the overall properties of the phosphate glass.

MgO is one such component which is preferably present in the phosphate glass of the invention. Advantageously, MgO is included in an amount of from 5.0% to 7.0% by weight, more preferably between 5.4 to 6.6% by weight.

$K_2O$ is a further component preferably contained in the glass, most conveniently in amounts of from about 0.2% to 0.4% by weight, more preferably between 0.24% to 0.37% by weight.

$SiO_2$ is also preferably included since it is believed to contribute beneficially to the weathering properties of the glass. In this regard, it is ideally present in an amount of between about 1.5% to 2.4% by weight, more preferably between 1.9% to 2.2% by weight.

Other components which are advantageously included are $Al_2O_3$ (preferably between 10.0% to 14.0% by weight), CaO (preferably between about 0.1% to 0.5% by weight) and $Na_2O$ (preferably between about 3.0% to 6.0% by weight).

Of course, the bulk of the glass composition will comprise $P_2O_5$ and this is usually present in amounts of between 65.0% to 80.0% by weight, more preferably between 69.0% to 72.0% by weight.

It should be understood that all of the ranges expressed herein are intended to embrace any range or specific value therebetween and are based upon the total weight of the glass.

As is well known in the art of glass making, the final composition of the glass is influenced by many factors. For example, the addition of identical quantities of starting materials will not result in the same product if the same process conditions are not used. Such factors as furnace temperature, atmosphere, wind speed in the furnace chimney, composition of the refractory chamber, etc. all have an influence on the resulting glass composition. In addition, a change in batch size will also have an effect so that a simple extrapolation of the amount of starting materials to increase or decrease the volume of glass to be produced will not necessarily give reproducible results even if other external factors are kept constant.

However, by routine investigation, it is within the capabilities of a person skilled in the art of glass making to produce an end product having the required copper (II) oxide content and indeed the desired quantities of other components.

By careful balancing of the copper (II) oxide content and the thickness of the filter within the parameters specified, we have been able to achieve high attenuation of IR radiation, particularly in the 700 nm to 900 nm range, yet without sacrificing spectral quality in the visible spectrum, especially towards the red end.

In optical terms, based on a 4 mm thick sample, the phosphate glass according the invention has a peak transmission of preferably 82.5%±5.0% at a peak wavelength of 512 nm±4 nm. More preferably, at such a thickness, the glass has a transmission of 60.0%±7.0% at 400 nm and an optical density of 2.65±10% at 700 nm.

Hence the invention further resides in a copper doped phosphate glass having a peak transmission of 82.5%±5.0%, a peak wavelength at 512 nm±4 nm, a transmission of 60%±7.0% at 400 nm and an optical density of 2.65±10% at 700 nm, when measured on a 4 mm thick sample.

Such characteristics represent the optimum values to achieve the right type of light emission to avoid temporarily blinding a pilot wearing night vision goggles.

It will be appreciated that by means of this invention, we have made a major contribution to improving air safety in poor visibility conditions.

Apart from this significant contribution to safety, our research in this area has resulted in another important advance in phosphate glass technology. In particular, we have found that it is possible to form or bend phosphate glass without causing cracking or affecting the long term stability of the glass. Furthermore, when the process of forming is applied to the IR filter glass of the invention it has no deleterious affect on the optical properties of the glass.

Whereas the shape of some lenses can be created simply by machining blocks or slabs of cast glass, for other shapes the only practical way of producing the lenses is by forming the glass.

Again, the ability of phosphate glass in accordance with the invention to undergo forming without detriment to the optical properties is surprising. In experiments conducted by us on known phosphate IR filter glass, heating up to the softening point or plastics state temperature has resulted in the known glass undergoing an unacceptable color change, the glass turning darker green thus causing more visible light attenuation. Such a marked shift in the visible light transmission further demonstrates the unsuitability of the prior art glass for aircraft lighting applications.

From a yet further aspect therefore, the invention comprises a process for forming phosphate glass comprising the steps of heating the glass until the glass reaches a plastic state and forms under its own weight, cooling the formed glass to an intermediate temperature, maintaining the glass at or about the intermediate temperature for an extended period, and allowing the glass to cool to ambient.

The above process is particularly suitable for forming phosphate glass having a thickness of from about 2 mm to 6 mm.

In order to achieve a desired shape, the glass is preferably placed in contact with a mold such that when the glass reaches a plastic state it forms by collapsing or slumping against the mold and adopts the same contours thereof. For example, the glass may be "slumped" into a generally concave mold surface or over an upwardly convex mold surface.

While it is preferred to allow the glass to bend or form "naturally" under its own weight, shaping may be alternatively achieved by pressing the glass into a mold, for example, by means of a two-part mold. However, pressing incurs an increased risk of creating stresses in the glass and hence requires exercise of all due care.

Ideally, the mold against which the glass is bent, "slumped" or pressed is made of a ceramic material. This is believed to be because ceramic has a similar expansion coefficient to the glass so that when cooling occurs it contracts at the same or similar rate to the glass.

Also, ceramic has a lower thermal conductivity than the traditionally used cast iron so that it does not chill the glass surface when the glass and mold are in contact. In this way, deterioration in surface quality and cracking can be successfully avoided. Another reason for choosing ceramic over cast iron is that cast iron oxidizes readily at the forming temperatures involved thus further reducing surface quality of the glass.

Generally, copper doped phosphate glass according to the invention reaches a plastic state at a temperature between 500° C. and 600° C., more usually between about 540° C. and 570° C., and therefore it is preferred that the temperature of the glass is not allowed to rise much beyond these temperatures during the forming process. The plastic state or softening temperature will differ according to the precise composition of the glass and it is within the ability of the skilled person to select the ideal temperature for slumping according to the composition in question.

The rate at which the glass is heated to the plastic state temperature is ideally controlled to avoid creating differential heating which can set up stress in the glass. Preferably the glass is heated at a rate of about 80° C. to 120° C./hour, more preferably at about 100° C./hour.

Actual melting of the glass takes place at much higher temperatures, usually around 1200° C., and it is important that the glass does not reach this temperature, otherwise the optical properties will almost certainly be affected. Ideally, heating of the glass is stopped once the plastic state temperature has been reached or is at least reduced so that the temperature does not rise above the plastic state temperature.

Once the glass has reached the plastic state, the heating is maintained at about the same temperature until the slumping is finished. Depending on the thickness of the glass, the bending or "slumping" of the glass is usually achieved over a period of 15 minutes to 1 hour; 30 minutes being about average.

Furthermore, after the glass has been formed, it is preferred that the annealing or cooling is allowed to proceed with the glass freed from the mold. To this end, the glass is preferably removed from the mold once it is rigid enough to maintain its shape.

After removal from the mold, the unsupported but formed glass is advantageously maintained at a temperature approaching but lower than the softening temperature for a further period before being allowed to cool to an intermediate temperature. For example, the formed glass is maintained at a temperature of between 20° C. to 100° C., preferably about 50° C., below the softening temperature for a period of between about 1 to 3 hours.

After forming, and ideally after being held close to but below the softening temperature for a period, the glass is allowed to cool to an intermediate temperature which is advantageously between about 250° C. and 350° C. An intermediate temperature of about 300° C. has been found to be particularly suitable.

Cooling to the intermediate temperature is most conveniently carried out at the same or similar rate as the heating takes place. A cooling rate of around 100° C./hour is therefore preferred.

The glass is then held at or close to the intermediate temperature for a period sufficient to release any stresses created in the glass during the slumping. A period of about 3 hours is generally considered sufficient, although this may be increased or decreased depending upon the extent to which the glass has been bent and its thickness. If the glass is not annealed in the correct manner, for example, if it is not allowed sufficient time to cool, the resulting glass is likely to be unstable at ambient and unworkable.

The formed glass is returned to ambient in a controlled manner. In other words, it should not be subjected to rapid or uneven cooling rates. Preferably the glass is allowed to cool at a rate of around 40° C./hour over a period of about 8 hours. Once cooled to ambient, it is preferred to remove by grinding or other known processes a portion of the glass around its lateral edges thereby to produce the ultimate shape for use.

The aforementioned process of forming phosphate glass may be employed either to form a complete filter or to form sections thereof for subsequent bonding together. Where bonding of various sections is required, conventional high temperature semi-rigid adhesives for optical use are generally employed.

After forming, the surface of the filter is usually subjected to a final grinding and polishing to perfect the surfaces ready for toughening.

Toughening processes are well known to those in the glass making field and require no further explanation here. It will be appreciated that after toughening, no further glass modification is generally possible. Thus all grinding, polishing, etc must be completed before the toughening stage. Where a lens is comprised of several sections, for example to achieve highly irregular shapes, the sections may be bonded together after the toughening stage.

Such complex shapes as those illustrated hereinafter have heretofore been impossible to achieve using known IR phosphate filter glass doped with copper without causing deterioration in the optical properties. This is because heat treatment of commercially available phosphate glass causes chemical reactions which adversely affect the optical transmission properties.

The composition of the glass according to the invention and the method for forming the same have together made it possible to form intricate shapes. In particular, because the phosphate glass of the invention is chemically more stable when heated than previously available glass and the method used to form the glass minimizes the extent to which it is exposed to high temperatures.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

A number of phosphate glasses manufactured into thick sheets in accordance with known glass-making techniques were ground to a thickness 3 mm. The ground sheets, representing the middle core of the manufactured glass, had compositions as set out in Table I. The quantities of the various components were calculated using XRF analysis and the percentages are expressed by weight on an oxide basis.

TABLE I

|  | Ex. 1 | Ex. 2 | Ex. 3 |
| --- | --- | --- | --- |
| $SiO_2$ | 2.02 | 1.89 | 2.14 |
| $TiO_2$ | <0.01 | <0.01 | <0.01 |
| $Al_2O_3$ | 11.8 | 11.8 | 12.1 |
| $Fe_2O_3$ | 0.04 | 0.04 | 0.04 |
| CaO | 0.42 | 0.41 | 0.43 |
| MgO | 5.58 | 5.39 | 5.62 |

TABLE I-continued

|  | Ex. 1 | Ex. 2 | Ex. 3 |
| --- | --- | --- | --- |
| $K_2O$ | 0.31 | 0.23 | 0.30 |
| $Na_2O$ | 4.39 | 4.38 | 4.50 |
| $B_2O_3$ (wet) | 0.09 | 0.12 | 0.10 |
| $Li_2O$ (wet) | 1.12 | 1.10 | 1.12 |
| F(wet) | 0.02 | 0.01 | 0.06 |
| OEF | 0.01 | <0.01 | 0.03 |
| $P_2O_5$ | 71.7 | 71.7 | 70.8 |
| $Cr_2O_3$ | <0.01 | <0.01 | <0.01 |
| $ZrO_2$ | <0.02 | <0.02 | <0.02 |
| PbO | <0.02 | <0.02 | <0.02 |
| ZnO | 0.03 | 0.05 | 0.02 |
| BaO | <0.01 | <0.01 | <0.01 |
| SrO | <0.01 | <0.01 | <0.01 |
| CuO | 1.62 | 1.54 | 1.67 |
| $As_2O_3$ | <0.01 | <0.01 | <0.01 |
| $CeO_2$ | <0.01 | <0.01 | <0.01 |
| $Nd_2O_3$ | <0.01 | <0.01 | <0.01 |
| CoO | <0.01 | <0.01 | <0.01 |
| L.O.I. | 0.07 | 0.07 | 0.02 |
| TOTAL | 99.19 | 98.73 | 98.95 |

An optical analysis of the glass of Example 1 showed a peak transmission of 82.88% at a peak wavelength of 508 nm, a transmission at 400 nm of 66.77% and an optical density at 700 nm of 2.12.

A similar analysis of the glass of Example 2 revealed a peak transmission of 81.24% at a peak wavelength of 518 nm, a transmission at 400 nm of 58.77% and an optical density at 700 mn of 1.814.

While both glass samples of Examples 1 and 2 exhibited desirable optical properties in terms of usefulness as an IR filter for an external aircraft light, the sample of Example 1 was particularly effective in the visible range.

Figure 1:
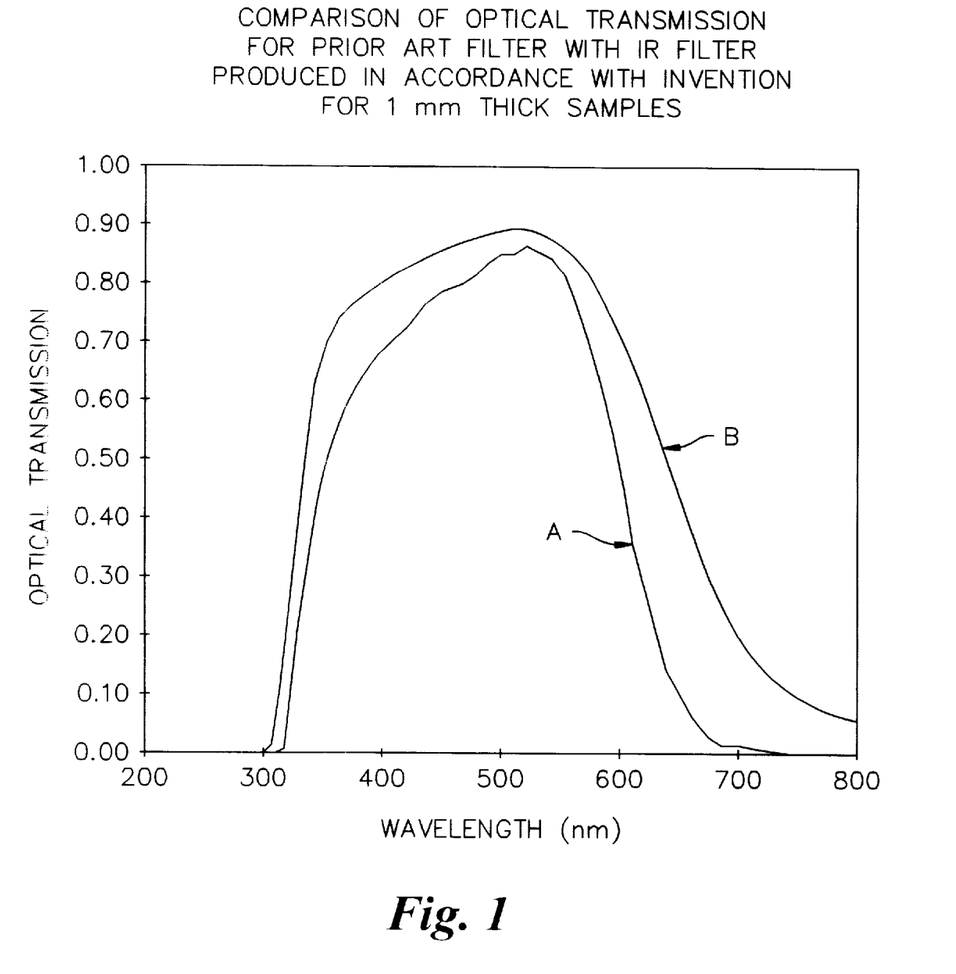
FIG. 1 is a graph showing a comparison of optical transmission between a known phosphate glass and an IR filter glass according to the invention.

In order to further demonstrate the improved optical properties of the phosphate glass according the invention, there is shown in FIG. 1 a transmission graph comparing a prior art filter (A) with an IR filter according to the invention (B). The results were taken using 1 mm samples for each glass.

It can be seen from FIG. 1 that the IR filter according to the invention (B) offers consistently higher transmission in the visible range than the prior art filter (A). At the red end of the spectrum, the difference is most marked. For example, at 650 nm the prior art filter (A) displays only about 10% transmission whereas the filter in accordance with the invention (B) displays about 50%.

Moreover, it can also be seen that the filter according to the invention (B) permits at least some transmission in the IR region whereas with the prior art filter (A) it is almost completely blocked.

Figure 2:
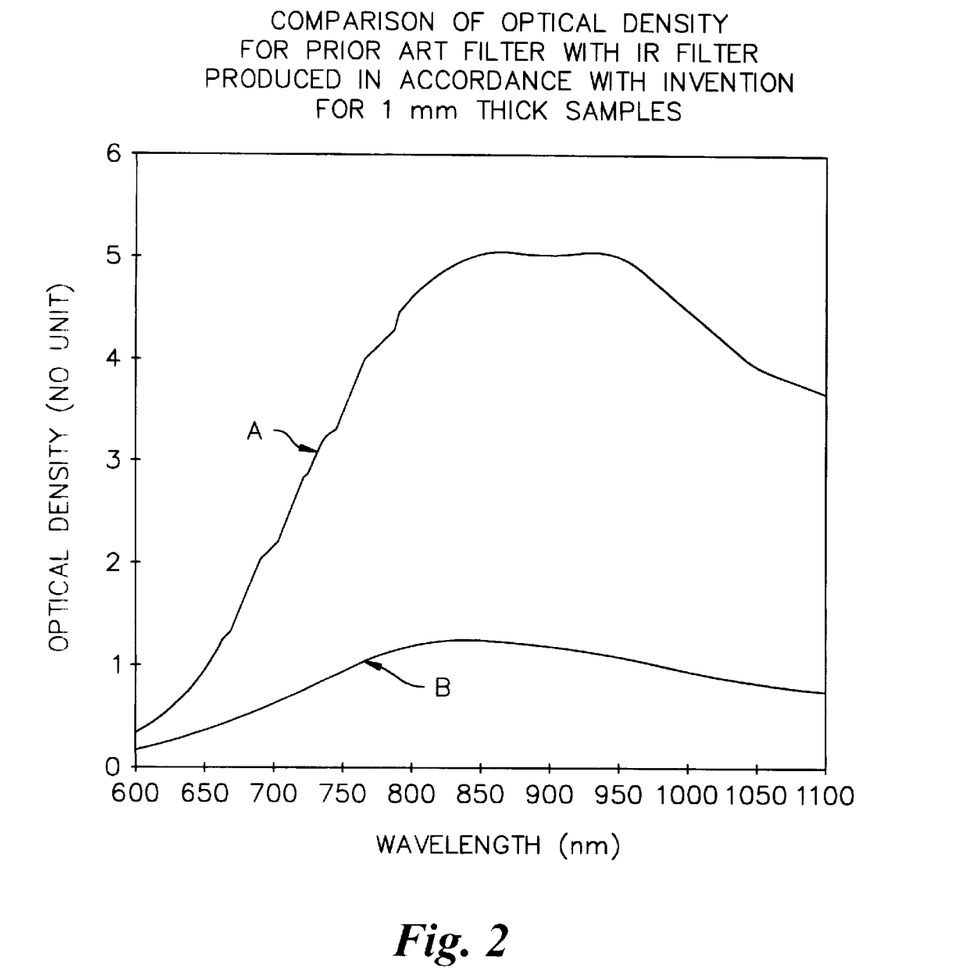
FIG. 2 is a graph showing a comparison of optical density in the IR region using the same glasses as FIG. 1.

The difference in the properties of the two glasses (A, B) in the IR region is perhaps more clearly seen from FIG. 2 which is a graph showing optical density for the same 1 mm thick samples (A, B) as used for FIG. 1.

In particular, it is evident that the optical density of the filter according to the invention (B) is much lower across the IR wavelengths than the prior art filter (A). Indeed, the attenuation in the IR region by the prior art filter (A) is such that a pilot wearing night vision goggles would not be able to see a light which incorporated such a filter.

There now follows an example of the forming process:

EXAMPLE 4

A piece of copper doped phosphate glass of approximate dimensions 100 mm×50 mm×4 mm thick was machined from the raw sheet of 10 mm thick by reducing the thickness equally on each face. The piece was then profiled on its edges to the pre-slump shape. The glass was subsequently placed on the ceramic mold in a furnace and the temperature raised from ambient to 550° C. at a rate of 100° C./hour. This temperature was maintained for 30 minutes by which time the glass had formed itself to the shape of the mold. The temperature was then allowed to fall to 500° C. over a period of 30 minutes and held at this temperature for 2 hours at which stage the glass was then removed from the mold inside the furnace. The furnace temperature was then reduced to 300° C. over a period of 2 hours and then held at 300° C. for 3 hours. After this intermediate stage, the furnace temperature was again reduced to ambient (25° C.) over a period of 8 hours. The slumped glass was then profiled to the final shape and polished to remove surface defects.

After completion of the forming process, the phosphate glass is finally toughened before being ready for fitting on an aircraft light, either as a replacement lens or as an auxiliary filter in conjunction with an existing lens.

Examples of various types of aircraft lights fitted with IR filters according to the invention are illustrated in FIGS. 3 to 10.

Figure 3:
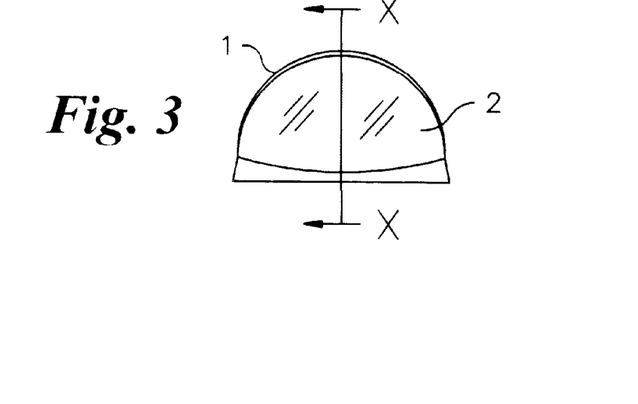
FIG. 3 is an end view of an aircraft tail light incorporating an IR filter in accordance with the invention.
Figure 4:
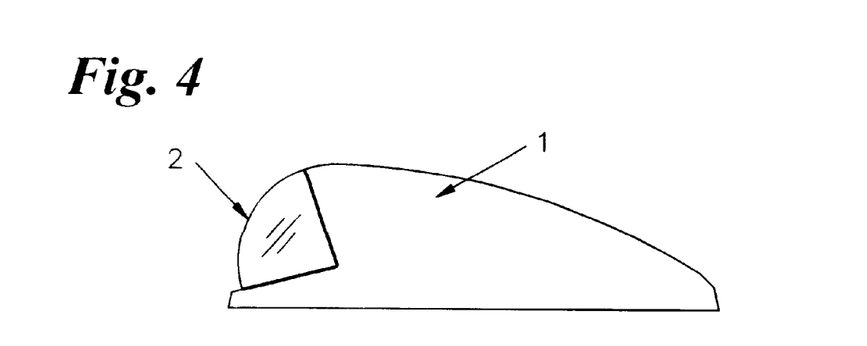
FIG. 4 is a side view of the light shown in FIG. 3.
Figure 5:
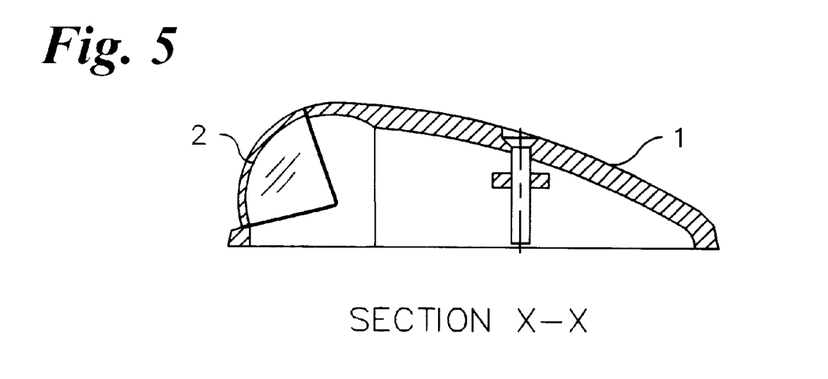
FIG. 5 is a cross-section along line X—X of FIG. 3.

In particular, an aircraft tail light shown in FIGS. 3 to 5 comprises an opaque housing or cast mount (1) in which is housed a light source (not shown). At one end of the housing (1) there is provided an opening which is covered by IR filter (2) having an outwardly convex surface and through which the light is filtered. IR filter (2) may be produced by simply machining from a block form of the phosphate glass, rather than by forming using the "slumping" process.

Figure 6:
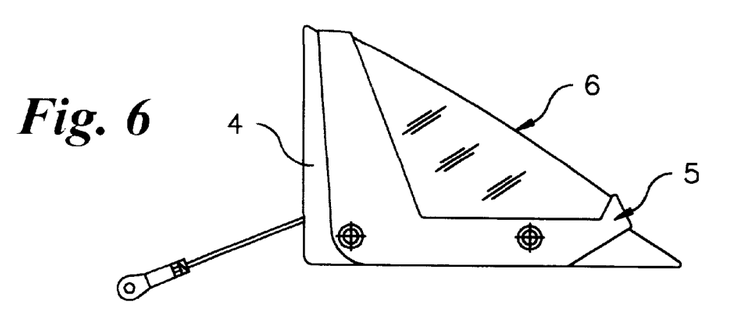
FIG. 6 is a side view of an aircraft port navigation light incorporating an IR filter in accordance with the invention.
Figure 7:
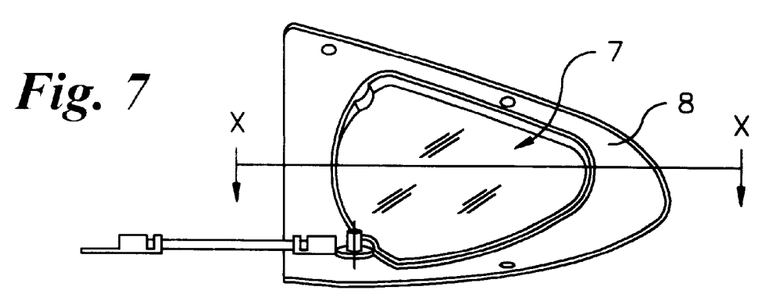
FIG. 7 is a bottom view of the navigation light of FIG. 6.
Figure 8:
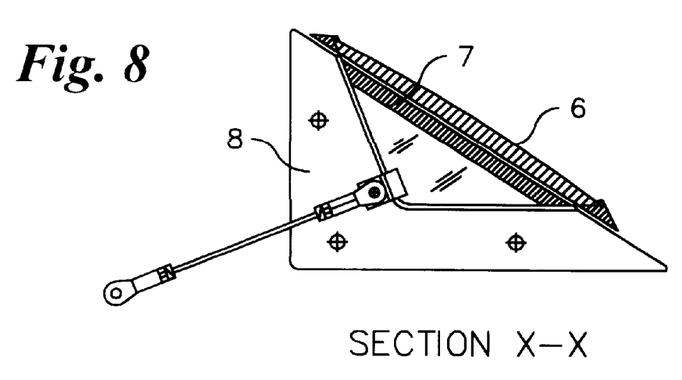
FIG. 8 is a cross-section along line X—X of FIG. 7.

A modified navigation light as illustrated in FIGS. 6 to 8 comprises a curved cowl (4) onto which is fitted auxiliary frame (5) retaining an IR filter (6) of the invention. As seen most clearly from FIG. 8, the IR filter (6) of the invention is fitted over the outer convex surface of existing lens (7) retained by the existing lens frame (8). The IR filter (6) is slightly curved when viewed in one plane (section X—X) yet is greatly curved when viewed in an orthogonal plane.

Figure 9:
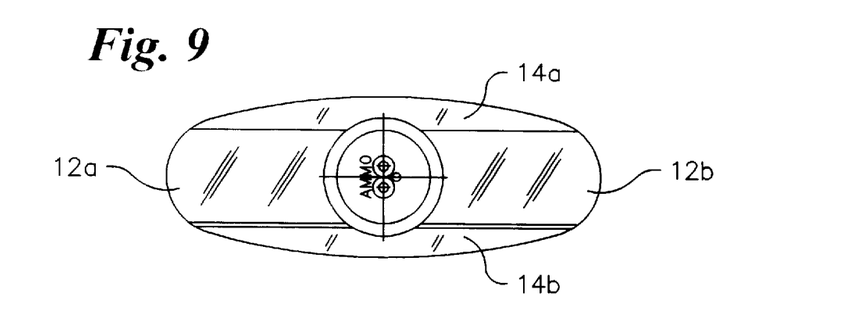
FIG. 9 is a plan view of an aircraft high intensity strobe light incorporating an IR filter in accordance with the invention.
Figure 10A:
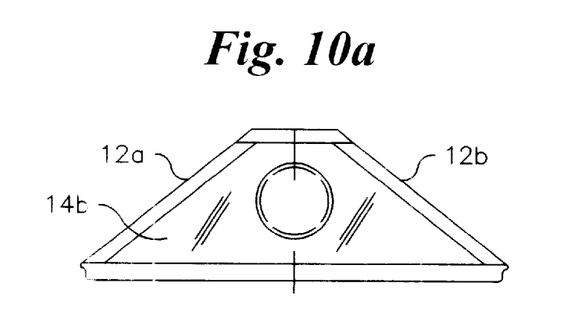
FIG. 10a is a side view of the light of FIG. 9.
Figure 10B:
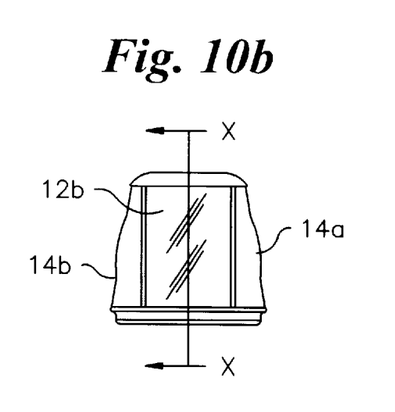
FIG. 10b is an end view of the light of FIG. 9.
Figure 11:
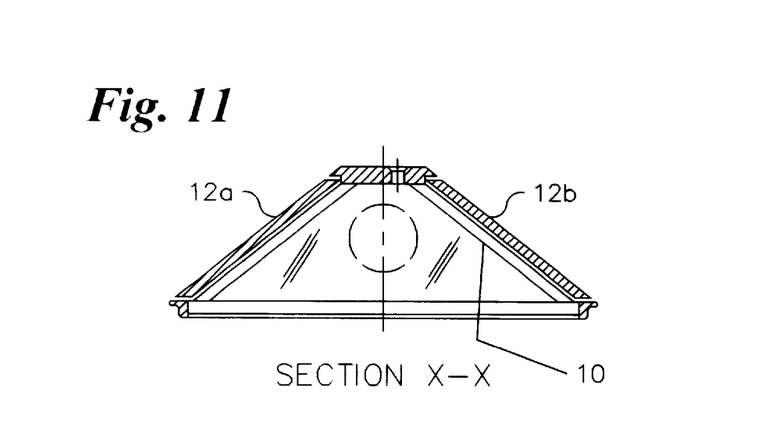
FIG. 11 is a cross-section along line X—X of FIG. 10b.

A high intensity strobe light as illustrated in FIGS. 9 to 11 comprises a filter mounting frame (10) on which is supported a filter made up of four sections of glass; end glasses (12a, 12b) and side glasses (14a, 14b). While end glasses (12a, 12b) are curved appreciably in one plane with a constant radius of curvature along the section, it may be seen from FIG. 10b that side glasses (14a, 14b) are of a more complex shape and include portions having different radii of curvature.

While particular embodiments have been described, it should be appreciated by those skilled in the art that various modifications may be made without departing from the broad scope of the invention. For example, while the invention has been most commonly described in terms of external aviation lighting, it will be appreciated that it is not limited thereto. In this regard, it will be understood that the invention is also applicable to internal aviation lighting, such as internal cockpit lighting and map reading lighting, to marine lighting, such as for ships and marine structures (oil rigs, lighthouses, buoys, etc), and to external lighting on high-rise buildings. Additionally, IR filter glass according to the invention may also find application in landing and other navigational lights at airfields.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A phosphate glass for attenuating infra red light emitted from a light source viewed through night vision systems comprising 65 to 80 wt. % $P_2O_5$, 10 to 14 wt. % $Al_2O_3$, 5 to 7 wt. % MgO and 1.5 to 1.8 wt. % CuO.

2. A phosphate glass according to claim 1, wherein the glass is toughened.

3. A phosphate glass according to claim 1, wherein the glass consists essentially of 2.02 wt % $SiO_2$, 11.8 wt % $Al_2O_3$, 0.04 wt % $Fe_2O_3$, 0.42 wt % CaO, 5.58 wt % MgO, 0.31 wt % $K_2O$, 4.39 wt % $Na_2O$, 0.09 wt % $B_2O_3$, 1.12 wt % $Li_2O$, 0.02 wt % F, 71.7 wt % $P_2O_5$, 0.03 wt % ZnO and 1.62 wt % CuO.

4. A phosphate glass according to claim 1, wherein the glass consists essentially of 1.89 wt % $SiO_2$, 11.8 wt % $Al_2O_3$, 0.04 wt % $Fe_2O_3$, 0.41 wt % CaO, 5.39 wt % MgO, 0.23 wt % $K_2O$, 4.38 wt % $Na_2O$, 0.12 wt % $B_2O_3$, 1.10 wt % $Li_2O$, 0.01 wt % F, 71.7 wt % $P_2O_5$, 0.05 wt % ZnO and 1.54 wt % CuO.

5. A phosphate glass according to claim 1, wherein the glass consists essentially of 2.14 wt % $SiO_2$, 12.1 wt % $Al_2O_3$, 0.04 wt % $Fe_2O_3$, 0.43 wt % CaO, 5.62 wt % MgO, 0.30 wt % $K_2O$, 4.50 wt % $Na_2O$, 0.10 wt % $B_2O_3$, 1.12 wt % $Li_2O$, 0.06 wt % F, 70.8 wt % $P_2O_5$, 0.02 wt % ZnO and 1.67 wt % CuO.

6. A phosphate glass according to claim 1, wherein the glass has the following properties:

- a peak transmission of 82.5%±5.0%;
- a peak wavelength at 512 nm±4 nm;
- a transmission of 60%±7.0% at 400 nm; and
- an optical density of 2.65±10% at 700 nm, when measured on a 4 mm thick sample.

7. An infra red filter for an external light on aircraft, ships or other structures comprising toughened phosphate glass, wherein the glass comprises 65 to 80 wt. % $P_2O_5$, 10 to 14 wt. % $Al_2O_3$, 5 to 7 wt. % MgO and 1.5 to 1.8 wt. % CuO.

8. An infra red filter as claimed in claim 7 in the form of an auxiliary lens fitted to an existing lens.

9. A method of making an infra red filter comprising grinding both faces of a sheet of phosphate glass having a composition comprising 65 to 80 wt. % $P_2O_5$, 10 to 14 wt. % $Al_2O_3$, 5 to 7 wt. % MgO and 1.5 to 1.8 wt. % CuO from a thickness of at least about 10 mm to a thickness of about 2 mm to 6 mm.

10. A method according to claim 9, wherein the sheet is ground to a thickness of about 3 mm to 5 mm.

11. A method of forming phosphate glass to produce a non-planar infra red filter, said method including heating the glass having a composition comprising 65 to 80 wt. % $P_2O_5$, 10 to 14 wt. % $Al_2O_3$, 5 to 7 wt. % MgO and 1.5 to 1.8 wt. % CuO until it reaches a plastic state and forms under its own weight, cooling the formed glass to an intermediate temperature and maintaining the glass at or close to the intermediate temperature for an extended period, and cooling the glass to ambient temperature.

12. The method according to claim 11, wherein the glass is formed by collapsing or slumping onto a mold surface.

13. The method according to claim 12, wherein the formed glass is removed the mold before cooling to the intermediate temperature.

14. The method according to claim 11, wherein the glass is heated to a forming temperature of from about 500° C. to 600° C.

15. The method according to claim 14, wherein the glass is heated to a forming temperature of from about 550° C. to 570° C.

16. The method according to claim 11, wherein the glass is cooled to an intermediate temperature of between about 250° C. to 350° C.

17. The method according to claim 16, wherein the glass is cooled to an intermediate temperature of about 300° C.

* * * * *